United States Patent Office 2,776,982
Patented Jan. 8, 1957

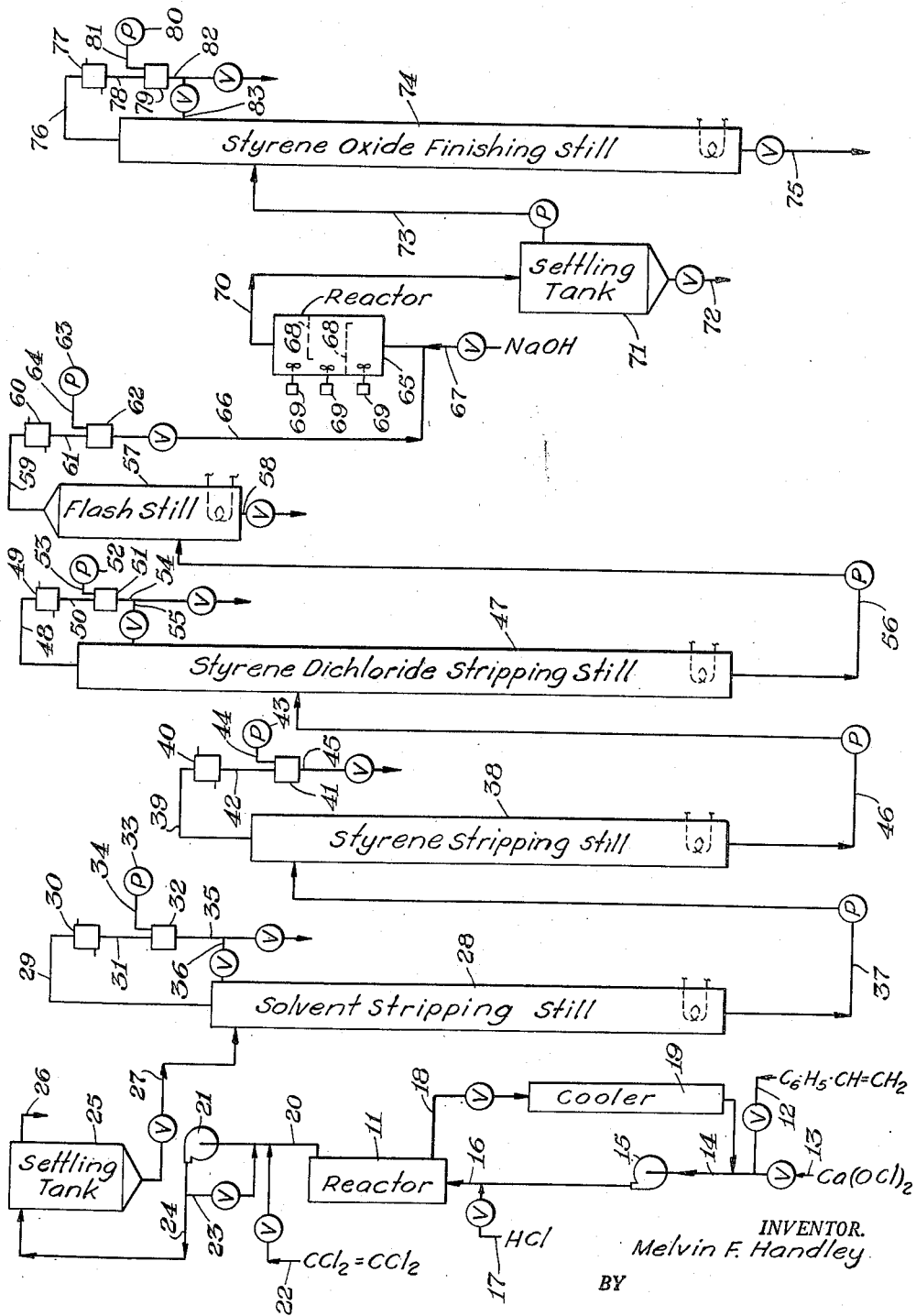

2,776,982

PRODUCTION OF STYRENE OXIDE

Melvin F. Handley, Freeport, Tex., assignor to The Dow Chemical Company, Midland, Mich., a corporation of Delaware Application March 9, 1953, Serial No. 341,159

4 Claims. (Cl. 260—348.6)

This invention relates to an improved process for producing high purity styrene oxide an nuclearly alkylated styrene oxides.

Styrene oxide, i. e. phenylethylene oxide, is a very desirable chemical for the production of resins, styrene glycol, beta-phenylethyl alcohol, and numerous other organic compounds of known value. Only trace amounts of halogen or certain halogen-containing contaminants in styrene oxide will frequently render it unsuitable as a starting material for the preparation of some of the above mentioned compounds. To employ high purity styrene oxide in organic synthesis is therefore usually advantageous and occasionally essential. This is especially true in the hydrogenation of styrene oxide to beta-phenylethyl alcohol over Raney nickel catalyst where the catalyst is easily poisoned by exceedingly small concentrations of the usual halogenated contaminants present in styrene oxide.

A number of processes for the preparation of styrene oxide have been described in the art. Unfortunately, however, these processes either employ expensive reagents, such as benzoyl hydroperoxide and the like, or else involve chlorination steps in which the yield of the product is low. Moreover, none of the commercially feasible processes produce styrene oxide of sufficiently high purity to be suitable for the preparation of beta-phenylethyl alcohol. Most styrene oxide processes involve the hypochlorination of styrene to form crude styrene chlorohydrin which in turn is dehydrochlorinated in aqueous alkali hydroxide to form crude styrene oxide. This crude styrene oxide contains numerous impurities, some of which it has heretofore been impossible to remove. Part of these impurities are carried along from the hypochlorination step while other impurities are formed during the dehydrochlorination step. During the hypochlorination step, for example, large amounts of styrene dichloride are generally produced. U. S. Patent 2,582,114 discloses that when chlorine gas is reacted with a suspension of styrene in aqueous sodiumbicarbonate, styrene dichloride is unavoidably produced in an amount about equal to the styrene chlorohydrin. Prior to the process of the present invention, large amounts of byproduct dichloride were also produced by reacting styrene with an acidified aqueous solution of a salt of hypochlorous acid. In addition to styrene dichloride, beta-chlorostyrene is another halogen-containing substance which is to be found among the products from the hypochlorination reaction. Although beta-chlorostyrene is readily separated from styrene chlorohydrin by fractional distillation, styrene dichloride to the contrary is not. In fact, Frisch in U. S. Patent 2,582,114 states that, "It is impossible to separate styrene chlorohydrin and styrene dichloride by fractional distillation because of the closeness of their boiling points and therefore it is necessary to work with the mixture". Because it has not previously been possible to effectively separate styrene chlorohydrin from styrene dichloride by fractional distillation, the total organic reaction mixture from the hypochlorination reaction has heretofore been reacted with hot aqueous caustic. During this reaction, styrene chlorohydrin is dehydrochlorinated to styrene oxide which may be separated from any remaining styrene dichloride by fractional distillation. However, in the dehydrochlorination reaction, some styrene dichloride is converted to alpha-chlorostyrene which cannot be fractionally distilled from styrene oxide. It is likewise not possible to separate styrene oxide by fractional distillation from beta-chlorostyrene carried along from the hypochlorination reaction. Therefore, high purity styrene oxide free from halogen-containing impurities cannot be prepared by the known processes hereinbefore described.

A new process has now been discovered for the production of high purity arylethylene oxides such as styrene oxide and nuclearly alkylated styrene oxides having from 8 to 10 carbon atoms in the molecule. The instant process broadly comprises reacting a nuclear monovinyl aromatic hydrocarbon having from 8 to 10 carbon atoms in the molecule with an acidified solution of an alkali or alkaline earth metal hypochlorite to form the chlorohydrin of the monovinyl aromatic hydrocarbon, subjecting the resulting organic reaction product to fractional distillation to separate therefrom substantially all material boiling below the boiling point of the aromatic chlorohydrin, and thereafter dehydrochlorinating the aromatic chlorohydrin so separated to form the corresponding arylethylene oxide. The arylethylene oxide so produced may then be separated from any residual impurities contained therein by fractional distillation. In this manner may be obtained high purity styrene oxide and nuclearly alkylated styrene oxides containing one or two methyl groups or an ethyl group, e. g. methyl-, dimethyl-, and ethyl-styrene oxides.

It has also been discovered that by accurately controlling the acidity of the well-mixed reactants throughout the hypochlorination of styrene for example, surprisingly high conversions and yields of styrene chlorohydrin are obtained even when a strong acid, such as hydrochloric acid, is employed to liberate hypochlorous acid from an alkali or alkaline earth metal salt thereof. Contrary to the previously quoted statement by Frisch, it has also been found that under proper conditions, styrene chlorohydrin can be effectively separated by fractional distillation from styrene dichloride. Moreover, such a separation is necessary in order to prepare high purity styrene oxide. It has also been found necessary to remove, as by fractional distillation, essentially all contaminating beta-chlorostyrene as well as most of the styrene dichloride from styrene chlorohydrin before it is dehydrochlorinated to styrene oxide since beta-chlorostyrene has a boiling point so similar to styrene oxide that it cannot be separated therefrom by fractional distillation. Furthermore, it has been observed that the amount of residual styrene dichloride converted to alpha-chlorostyrene during the dehydrochlorination of styrene chlorohydrin may be advantageously and effectively decreased by employing a considerably lower reaction temperature than generally employed in the art. This is important when styrene oxide of exceptionally high purity is required since alpha-chlorostyrene, like beta-chlorostyrene, cannot be separated from styrene oxide by fractional distillation.

More particularly, the instant process for producing high purity arylethylene oxides, especially high purity styrene oxide, comprises reacting a nuclear monovinyl aromatic hydrocarbon having from 8 to 10 carbon atoms in the molecule with an aqueous solution of an alkali or alkaline earth metal hypochlorite, e. g. NaOCl or Ca(OCl)$_2$, acidified with an acid, acid anhydride, or solution of an acid salt capable of liberating hypochlorous acid therefrom, e. g. H$_2$CO$_3$, CO$_2$, or NaHCO$_3$. Following the hypochlorination reaction, the resultant organic reaction product is distilled to separate material boiling below the point at which the chlorohydrin of the vinyl aromatic hydrocarbon boils; e. g. the unreacted vinyl aromatic hydrocarbon, the dichloride of the vinyl aromatic hydrocarbon, etc. Thereafter, the purified chlorohydrin of the vinyl aromatic hydrocarbon is dehydrochlorinated to the corresponding arylethylene oxide with an aqueous solution of an alkali metal hydroxide, e. g. NaOH or KOH. The total organic reaction product so produced may then be subjected to fractional distillation to separate high purity arylethylene oxide therefrom.

The process of the invention may be easily understood from the following description of a preferred method for producing high purity styrene oxide with reference to the apparatus illustrated in the drawing.

The initial hypochlorination step is carried out in a continuous manner as hereinafter described in an acid-resistant resin-coated reaction vessel 11. Styrene from a valved line 12 and aqueous calcium hypochlorite from another valved line 13 are introduced into a line 14 carrying a recycle stream to a high speed recirculating pump 15. Styrene and calcium hypochlorite are thoroughly mixed into the recycle stream in the pump 15 and passed on to the reactor 11 via a line 16. Just prior to entering the reactor, the stream is acidified with hydrochloric acid from a valved supply line 17. The flow of acid is continuously controlled to maintain the acidity of the stream, i. e. the reaction mixture, at a constant pH value, which may be measured by pH electrodes (not shown) in the reactor 11. In passing through the reactor 11, styrene is hypochlorinated to styrene chlorohydrin. Following this reaction, the greater portion of the product mixture leaves the reactor via a valved line 18 and passes into a cooler 19. The stream from the cooler 19 is recycled through the line 14 as previously described. A small portion of the product mixture overflows out of the top of the reactor 11 through a line 20 into another high speed recirculating pump 21 where it is intimately mixed with at least an equal weight of an inert solvent such as perchloroethylene from a valved supply line 22. By means of a valved by-pass line 23, the outlet line 24 from the pump 21 is connected to the inlet line 20. The perchloroethylene-product mixture is thereby caused to recirculate, finally passing on through a line 24 into a settling tank 25 wherein it separates into an upper brine layer and a lower organic layer. The brine layer overflows out of the top of the settling tank 25 through a line 26 while the organic portion in the bottom of the tank passes through a valved line 27 to a solvent stripping still 28. Here perchloroethylene and some water are separated from the organic product and pass overhead from the still through a line 29 and into a condenser 30. The liquid condensate passes through a line 31 into a receiver 32 connected to a vacuum pump 33 by means of a line 34. Liquid perchloroethylene and water pass out of the bottom of the receiver 32 by means of a line 35, some of the wet perchloroethylene being returned to the still 28 via a valved line 36 and the remainder passing on to solvent storage (not shown). From the bottom of the still 28, solvent-free organic product is pumped through a line 37 to a styrene stripping still 38 where styrene is distilled away from the higher boiling material and taken off overhead through a line 39 to a condenser 40. From here, condensate passes into a receiver 41 via a line 42. To the top of the receiver 41 is attached a vacuum pump 43 by means of a line 44. Styrene passes out of the bottom of the receiver 41 through a line 45 and on to storage (not shown). Leaving the bottom of the styrene stripping still 38 through a line 46, the higher boiling material is passed into a styrene dichloride stripping still 47 wherein styrene dichloride, beta-chlorostyrene, and other lights are separated from the styrene chlorohydrin and higher boiling materials. The total light fraction passes out of the top of the styrene dichloride stripping still 47 through a line 48 and into a condenser 49. The liquid condensate passes from the condenser via a line 50, to a receiver 51 which is evacuated by a means of a pump 52 connected to a line 53. Liquid passes from the receiver 51 through a line 54, some being returned to the still column 47 by a valved line 55 and the remainder passing to storage (not shown). From the bottom of the styrene dichloride stripping still 47, styrene chlorohydrin and highers pass out through a line 56 and are forwarded to a flash still 57 wherein styrene chlorohydrin is separated from higher boiling material, e. g. tar. The tar so separated drains through a line 58. The purified styrene chlorohydrin coming out of the top of the still 57 passes through a line 59 into a condenser 60. From there, the liquid condensate passes through a line 61 to a receiver 62 connected to a vacuum pump 63 by means of a line 64. The condensate passes from the receiver 62 to a dehydrochlorination reactor 65 via a valved line 66 into which aqueous sodium hydroxide is fed by another valved line 67. Inside the reactor 65, which is fitted with partial separatory baffles 68, the two feeds are thoroughly mixed by means of motor driven stirrers 69. In passing through the reactor 65, styrene chlorohydrin is dehydrochlorinated to styrene oxide. The product mixture flows out of the reactor by a line 70 and into a settling tank 71 where separation into layers takes place. The lower brine layer passes out of the bottom of the tank 71 through a valved line 72. The upper crude styrene oxide layer is withdrawn from the tank 71 through a line 73 and passed into a styrene oxide finishing still 74. In this still, styrene oxide is separated from higher boiling material, e. g. tar, which drains from the bottom by a line 75. Styrene oxide vapor distills overhead, passing out of the still 74 through a line 76 and into a condenser 77. From there, liquid condensate passes through a line 78 into a receiver 79 connected to a vacuum pump 80 via a line 81. Part of the liquid passing out of the receiver 79 through a line 82 is returned to the still 74 by a valved line 83 while the remainder passes on to styrene oxide storage (not shown).

To produce high purity styrene oxide by the instant process, the hypochlorination reaction is preferably carried out by adding an aqueous solution of the metal hypochlorite, e. g. sodium hypochlorite or calcium hypochlorite, and an acidifying substance, e. g. carbon dioxide or hydrochloric acid, to a well-agitated aqueous suspension of styrene maintained at a pH above 4 but not much higher than 6. The temperature of the reaction is ordinarily maintained within the range of from 0° to 50° C. and more frequently from 10° to 40 C. Although a temperature as high as 60° C. may sometimes be employed, higher reaction temperatures usually result in polymerization of styrene and dehydrochlorination of styrene chlorohydrin to a marked degree.

The acidity of the reacting mixture is measured, e. g. with pH electrodes, and controlled within a pH range of about 4 to 6, preferably from 5 to 6. In general, the acidity is controlled by the gradual addition of carbon dioxide or hydrochloric acid. If during the hypochlorination of styrene, the pH of the reacting mixture is allowed to rise above 6, a lachrymator, chloroacetophenone, will form. If a pH below 4 is allowed, the formation of beta-chlorostyrene and styrene dichloride is increased. The control of pH at about 5 to 6 is desirable for other reasons since the corrosion to metal equipment increases as the pH decreases. When pH control is poor and fluctuates e. g. from 3 to 8, or when the pH rises above 6, a brown frothy material is formed during the reaction which interferes with separation of the aqueous and organic portions of the reaction product. Where the hypochlorination is carried out with calcium hypochlorite, carbon dioxide is not ordinarily employed as the acidifying agent since it forms calcium carbonate which settles out of the organic or oil layer and creates a separation problem. By using hydrochloric acid to acidify the calcium hypochlorite, a water-soluble salt, i. e. calcium chloride, is formed which usually remains dissolved in the aqueous or brine layer of the reaction product and thereby simplifies the workup of the organic or oil layer. Relatively strong hydrochloric acid of about 30 percent strength may be employed for this purpose.

Although the solid hypochlorite itself, e. g. $Ca(OCl)_2$, may sometimes be used in the hypochlorination of styrene, an aqueous solution of the hypochlorite is generally preferred. Aqueous calcium hypochlorite containing approximately 6 percent available chlorine, while chemically suitable for the hypochlorination of styrene, is very corrosive to metal equipment. Consequently, an aqueous solution containing about 3.0 to 3.5 percent available chlorine is usually employed.

Theoretically, a mole of styrene should react with one equivalent weight of the metal hypochlorite to form one mole of styrene chlorohydrin, e. g. one mole of NaOCl or one-half mole $Ca(OCl)_2$, but in practice, greater than one equivalent weight of the metal hypochlorite is preferably used. It has been found that a reactant ratio as low as 1.1 moles of NaOCl per mole of styrene gives good conversions and yields of styrene chlorohydrin. In reacting styrene with $Ca(COl)_2$ acidified with hydrochloric acid, from 0.6 to 1.0 mole of the hypochlorite per mole of styrene has been advantageously employed. In general, however, from about 0.7 to 0.8 mole of calcium hypochlorite per mole of styrene are preferred. Above an equimolar ratio of calcium hypochlorite to styrene, a large amount of styrene dichloride is made in proportion to styrene chlorohydrin and the formation of tarry material becomes disproportionally large. Some unreacted styrene is to be found in the reaction products, even when equimolecular proportions of calcium hypochlorite to styrene are employed.

A correlation has been observed between the ratio of the reactants, e. g. the ratio of hypochlorite to styrene, and the specific gravity of the product oil. The latter is likewise related to its styrene chlorohydrin content. As the ratio of hypochlorite to styrene increases, the specific gravity and also the styrene chlorohydrin content of the product oil increase. Thus, the specific gravities of product oil samples afford a good indication of the progress of the reaction and permit adjustments to the reactant ratio during continuous operation. The specific gravity of the product oil under ordinary operating conditions runs from about 1.10 to 1.14 when the mole ratio of calcium hypochloride to styrene is in the range of 0.7:1 to 0.8:1.

The hypochlorination reaction may be carried out either batchwise or continuously. In batchwise operation, styrene and water are initially charged into a pot-type reaction vessel and subjected to rapid thorough mixing. An acidifying substance such as hydrochloric acid or gaseous carbon dioxide is then passed into the well-agitated styrene-water mixture to attain the desired pH. Thereupon an aqueous solution of sodium or calcium hypochlorite is added to the reaction mixture while maintaining the desired pH with the acidifying substance until reaction is substantially complete. It is usually more desirable, however, to carry out the hypochlorination reaction in a continuous manner by simultaneously adding streams of all of the reactants to a suitable reaction vessel as hereinbefore described. Contact time in such a reactor is controlled by the rate at which the reactants are fed, a high feed rate resulting in a short contact time. Contact time, e. g. hold up time in the reactor, should be sufficiently long for most of the styrene to be reacted. Good conversions and yields of styrene chlorohydrin have been obtained when the contact time has been in the range of 20 to 50 minutes and longer. Conversion to the chlorohydrin falls off when contact time is much less than 20 minutes.

The total product from the hypochlorination reaction separates upon standing into two rather indistinct layers, an upper aqueous or brine layer and a lower organic or oil layer. Separation into distinct layers is hindered by a brown froth formed during hypochlorination which gravitates to the interfacial region. Increasing the gravity of the product oil from 1.12 to 1.16 by raising the reactant ratio during hypochlorination does not appear to markedly increase the rapidity or the degree of separation. Even upon long standing, the completeness of separation is not greatly increased. This results in some loss of organic product, although a considerably larger loss is sustained due to the solubility of product oil in brine. Good separation and recovery of product oil may be obtained, however, by thoroughly mixing the total product from the hypochlorination reaction with a liquid perchlorinated aliphatic hydrocarbon solvent, particularly one containing from 1 to 2 carbon atoms in the molecule, e. g. carbon tetrachloride or perchloroethylene. When the total product is mixed with approximately one to two times its weight of such a solvent, the brown froth is almost completely broken up, oil is extracted from the brine, and separation into layers is greatly facilitated due to the increased gravity imparted to the oil by the heavy solvent. The net result is a vast improvement in product oil recovery.

To produce high purity styrene oxide, the crude product oil so obtained is subjected to fractional distillation to separate styrene chlorohydrin from other side chain-chlorinated compounds, such as styrene dichloride and betachlorostyrene. The degree of purity of the styrene oxide ultimately prepared by the process of the invention is directly dependent on the degree to which the chlorinated ethyl- and vinyl- benzene impurities are removed from styrene-chlorohydrin prior to hydrolysis. Before removing these impurities, it is generally advantageous to distill off any unreacted styrene from the crude styrene chlorohydrin. The styrene so separated may be returned to the hypochlorination step of the process and thereby increase the overall yield of styrene oxide. If desired, styrene chlorohydrin from which lower boiling substituents have been separated by distillation may itself be flash distilled to separate it from higher boiling materials, such as styrene polymer and tars. When the crude oil from the hypochlorination step has been diluted by solvent, e. g. perchloroethylene, it is first desirable to separate this liquid by flash distillation, and then proceed with the distillation as previously recommended.

Although all distillations of the process of the invention may be conducted batchwise, continuous operation is preferred, i. e. continuously feeding material to be separated to the still column and continuously removing the fractionated material therefrom. Ordinary still columns packed with ceramic rings and long enough to have the required number of theoretical plates for good separation are satisfactory. Nonferrous equipment is preferably used in all distillation steps involving styrene chlorohydrin since the decomposition of this compound and resultant tar formation appear to be catalyzed by iron. To reduce tar formation, a half to one percent by weight of a dehydrohalogenation inhibitor such as 1-nitroso-2-naphthol may be added to the crude styrene chlorohydrin or styrene oxide prior to distillation. All distillative separations are carried out under reduced pressures usually below 20 mm. and preferably below 5 mm. Hg absolute. At these pressures, lower temperatures may be employed to minimize decomposition by heat.

In carrying out the distillations of the instant process in a continuous manner according to the preferred sequence of steps as illustrated in the drawing, solvent-containing crude styrene chlorohydrin is distilled under a reduced pressure at a reflux ratio adjusted according to the dictates of the solvent separated. No reflux is usually employed when the solvent is carbon tetrachloride but perchloroethylene requires reflux due to the proximity of its boiling point to styrene. The solvent so distilled is reemployed in the process and the higher boiling crude styrene chlorohydrin is passed on to a styrene stripping still.

In separating styrene from crude styrene chlorohydrin, little or no reflux is used. Low pressures and correspondingly low temperatures are also employed in this separation since under the influence of heat, styrene polymerizes and styrene chlorohydrin tends to decompose. In usual practice, a small percentage by weight of a polymerization inhibitor such as p-tertiary-butylcatechol is added to the crude styrene chlorohydrin prior to distillation.

After removing styrene from crude styrene chlorohydrin, styrene dichloride and substantially all lower boiling components are generally separated by distillation. This distillation usually consists of removing the lower boiling constituents overhead and taking styrene chlorohydrin off the bottom along with any tar. In order to obtain a high styrene chlorohydrin concentration in the bottoms, approximately 10 percent chlorohydrin is frequently taken off overhead. Reflux ratios of approximately 6 to 1 and still column pressures of less than five millimeters of mercury absolute are generally employed.

To remove tar from styrene chlorohydrin after separating it from styrene dichloride and lower boilers, styrene chlorohydrin is frequently flash distilled, e. g. no reflux is employed. No decomposition has been observed in carrying out this flash distillation at approximately 0.5 millimeter mercury absolute pressure.

The dehydrochlorination of styrene chlorohydrin to styrene oxide may be carried out in the same or similar equipment to that employed for the hypochlorination of styrene. According to the instant process, styrene chlorohydrin may be dehydrochlorinated to styrene oxide with aqueous sodium hydroxide at a temperature in the range of 20° to 80° C., preferably from 30° to 60° C. In large scale equipment, continuous operation is generally preferred and usually employed by simultaneously feeding both styrene chlorohydrin and aqueous sodium hydroxide to a reaction vessel to effect dehydrochlorination and continuously removing the product mixture consisting chiefly of styrene oxide and brine. Styrene chlorohydrin relatively free from impurities is preferably employed in the dehydrochlorination reaction. Good conversions and yields of styrene oxide are ordinarily obtained using equimolecular proportions of styrene chlorohydrin and aqueous sodium hydroxide. Excess alkali hydroxide does not appear to give more complete dehydrochlorination that an equimolar ratio. Although either aqueous sodium or potassium hydroxide is satisfactory for the dehydrochlorination reaction, aqueous sodium hydroxide of 15 to 20 percent strength is usually preferred both from a standpoint of carrying out the reaction and for the ease in separating the resultant crude product oxide from the brine. A contact time or holdup time in the reactor sufficiently long to dehydrochlorinate most of the styrene chlorohydrin to styrene oxide is desirable. Almost complete reaction may generally be achieved in less than 30 minutes at 60° C. Longer contact times are usually employed to attain substantially complete reaction at lower temperatures since the reaction rate is known to decrease by more than one-half for each 10° C. drop in temperature. However, the difference in the rate of dehydrochlorination for styrene chlorohydrin and styrene dichloride becomes disproportionately larger and larger as the temperature of reaction is progressively lowered, e. g. from 60° to 40° C. Therefore, the dehydrochlorination of styrene chlorohydrin containing a trace of styrene dichloride is accompanied by considerably less conversion of the dichloride to the contaminating alpha-chlorostyrene at a temperature of 40° C. than at 60° C. In this manner, it is possible and entirely practicable to obtain styrene oxide of extremely high purity. For example, finished styrene oxide with a total chloride content of 0.05 to 0.08 percent has been repeatedly prepared by the dehydrochlorination of purified styrene chlorohydrin at 60° C., while finished styrene oxide with a total chloride content of 0.02 to 0.05 percent has just as consistently been made from comparable purity styrene chlorohydrin at 40° C.

As hereinbefore stated, it is highly desirable to employ relatively pure styrene chlorohydrin in the dehydrochlorination step. However, high purity styrene oxide may be prepared from styrene chlorohydrin containing a considerable amount of higher boiling material, e. g. tar, if styrene dichloride and lower boiling contaminants have been removed prior to dehydrochlorination. Although 10 to 15 percent tar in styrene chlorohydrin apparently has no effect on the purity of the oxide made therefrom, the rate at which the chlorohydrin is converted to the oxide is slower for the tar-containing material than for relatively pure chlorohydrin. Furthermore, in dehydrochlorinating this tar-containing styrene chlorohydrin to styrene oxide, some difficulty has been encountered in separating the crude oxide and brine layers, probably due to the closeness of their specific gravities.

Following dehydrochlorination, the crude styrene oxide is separated from the brine layer by gravity separation and distilled to produce high purity styrene oxide. When the crude styrene oxide from the dehydrochlorination reaction contains a relatively large proportion of tar, the crude oxide so produced is desirably flash distilled away from the tar prior to fractionation so that lower distillation temperatures may subsequently be employed during fractionation. The styrene oxide distillation is usually carried out in a continuous manner in an ordinary packed still column operated at a pressure below 10 mm. Hg absolute. Usually an inhibitor such as 0.5 percent 1-nitroso-2-naphthol is added to the crude styrene oxide prior to distillation to prevent chlorinated impurities such as styrene chlorohydrin from splitting off HCl which, if present, may catalyze the isomerization of styrene oxide to an aldehyde.

The process of the invention is particularly suitable for preparing styrene oxide having an average total-chloride content after distillation of 0.07 percent, an average purity by freezing point of greater than 99 mole percent, and a refractive index of 1.5270 at 35° C. Some styrene oxide containing as low as 0.015 percent total chloride has been prepared by the process of the invention.

The following examples are illustrative but are not to be construed as limitative.

EXAMPLE 1

(A) High purity styrene oxide was prepared from styrene according to the instant process as hereinafter described.

In the initial hypochlorination step, styrene was converted to styrene chlorohydrin by reacting it with an acidified aqueous solution of calcium hypochlorite in small scale hypochlorination equipment arranged similarly to that previously illustrated in the drawing. Styrene, 3 percent aqueous calcium hypochlorite, and 15 percent hydrochloric acid were continuously fed into a high speed centrifugal pump wherein they were thoroughly mixed and passed on to a glass reaction column 1.5 inches in diameter by 20 inches long. A mole ratio of calcium hypochlorite to styrene of about 2:1 was employed together with sufficient hydrochloric acid to maintain the reactant mixture at a pH between 5 and 6. During a period of about 5.5 hours, a total of 1192 grams of styrene (11.45 moles) was fed to the reactor. Residence time in the reactor was approximately 30 minutes. The temperature of the reactants was measured by means of a thermocouple inserted into a well in the top of the reaction column at a point near its outlet. The reactants were maintained at a temperature of about 40° C. by circulating a liquid coolant through a jacket surrounding the reaction tube. By means of pH electrodes extending into the reactor effluent stream, the acidity of the reaction mixture was continuously indicated on a pH meter and controlled at a pH of about 5 to 6 by adjusting the flow of acid to the system. After passing the total effluent from the reactor through a cooler, a small portion of this stream was continuously withdrawn into a separation vessel while the remainder was recycled through the pump and returned to the reactor. That portion of the total reaction product withdrawn into the separatory vessel formed two layers upon standing, an upper brine layer and a lower organic layer containing chiefly styrene chlorohydrin. This wet crude styrene chlorohydrin layer was found to weight 1641 grams and have a specific gravity of about 1.14.

The fractional distillation of the crude organic product from the hypochlorination step was carried out in a glass sieve-plate still having 30 plates. All 1641 grams of the wet crude styrene chlorohydrin was charged into the still and subjected to fractional distillation under a reduced pressure at a reflux ratio of 6:1. The fractions obtained from the distillations are identified in the accompanying table. The boiling point and various other properties are given for each fraction including the percent by weight of the fraction in the total charge to the still.

(B) To demonstrate the superiority of the improved process of the invention, a run not in accord with the instant process was carried out in a similar manner to Run A except that one of the procedural steps was omitted, i. e. the distillative separation of styrene chlorohydrin prior to dehydrochlorination was aqueous sodium hydroxide. Upon distilling the crude styrene oxide so obtained under similar conditions and in the same kind of still employed in Run A, i. e. a sieve-plate distillation column having 30 plates, a two-gallon sample of styrene oxide was collected which analyzed 1.40 percent by weight total chloride. Upon redistilling this 2-gallon sample in the same still, the center half-gallon was collected and found to contain 1.36 percent total chloride. This half-gallon sample of styrene oxide was again redistilled. The center quart contained 1.16 percent total chloride, almost twenty times more chloride than the product of Run A which was produced according to the process of the invention.

EXAMPLE 2

High purity para-methylstyrene oxide was prepared

*Fractional distillation of 1641 grams of wet crude styrene chlorohydrin*

| Fraction | Wt. of Fraction, Grams | Wt. Percent of Still Charge | Boiling Point, mm. Hg abs. | Density | Refractive Index | Total Cl (Parr Bomb), Wt. Percent | Chloride by Hydrolysis, Wt. Percent |
|---|---|---|---|---|---|---|---|
| Water | 83.5 | 5.1 | | | | | |
| Styrene | 460 | 28.0 | 45° C. at 20 mm | | | | |
| Beta-chlorostyrene | 49.5 | 3.0 | 80° C. at 5 mm | 1.104 at 25° C | 1.5800 at 25° C | 25.6 | |
| Styrene dichloride | 97.0 | 5.9 | 90° C. at 4 mm | 1.24 at 15° C | 1.5544 at 15° C | 40.5 | |
| Styrene chlorohydrin | 850 | 51.6 | 100° at 3 mm | 1.165 at 20° C | 1.5400 at 20° C | 22.5 | 22.5 |
| Residue | 100 | 6.1 | | | | | |
| Total recovery | 1,640.0 | | | | | | |

The dehydrochlorination of styrene chlorohydrin was carried out in a jacketed glass vessel equipped with a mechanical stirrer. Into this reaction vessel was charged 850 grams (5.46 moles) styrene chlorohydrin obtained in the above described distillation step and 833 grams of 30 percent aqueous sodium hydroxide (6.25 moles). The reactants were thoroughly mixed for a period of about 30 minutes during which time the reaction temperature was maintained at 40° C. by circulating a cooling liquid through the jacket surrounding the reaction vessel. Following the reaction, the product mixture separated into a lower brine layer and an upper crude styrene oxide layer weighing 650 grams.

The distillative purification of the crude styrene oxide was accomplished in a glass sieve-plate still column having thirty plates. All 650 grams of the crude styrene oxide from the dehydrochlorination step was charged into the still flask and subjected to fractional distillation. Employing a 6:1 reflux ratio and a reduced pressure of 5 mm. Hg absolute, the styrene oxide distilled at a temperature of about 70° C. A total of 610 grams (5.07 moles) of high purity styrene oxide was obtained for an overall yield of 69 mole percent calculated on the basis of the styrene consumed, i. e. styrene initially charged minus styrene recovered. This high purity styrene oxide was found to have the following properties; purity (by freezing point), 99 plus percent; total chloride, 0.06 percent; refractive index at 35° C., 1.5279; density at 25° C., 1.048.

from para-methylstyrene according to the following procedure.

A total of 400 grams (3.38 moles) of para-methylstyrene together with 400 grams of distilled water were charged into a jacketed glass reaction flask and subjected to thorough, rapid, and continuous mixing. Into the aqueous suspension of styrene so obtained was bubbled gaseous carbon dioxide to acidify it. When an acidity corresponding to a pH of about 6 was attained, 3500 grams of 5 percent aqueous calcium hypochlorite (approximately 5 moles) was gradually passed into the well-agitated mixture during a period of 3.5 hours. Throughout the run, the acidity was determined by pH meter and maintained at a pH of about 6 by the regulated addition of carbon dioxide to the reacting mixture. The reaction mixture was controlled at about 25° C. by circulating cooling water through the jacket of the reaction flask. Following the reaction, the product mixture was transferred to a separatory funnel and allowed to separate into layers. The heavy oil layer having a density of 1.13 at 28° C. was separated from the brine and found to weigh 476 grams. A 26 gram portion of this material was used for analysis.

The major portion of the crude organic product weighing 450 grams was charged into a flask, inhibited with 0.5 weight percent 1-nitroso-2-naphthol, and subjected to fractional distillation on a sieve-plate column having 30 plates. This fractionation was carried out at a pressure of about 1 millimeter Hg absolute and a reflux ratio of 6 to 1. The following table contains the data for the distillation.

*Fractional distillation of 450 grams of crude p-methylstyrene oxide*

| | Weight of Fraction, Grams | Wt. Percent of Still Charge | Boiling Point, mm. Hg absolute | Density at 27° C. | Refractive Index at 35° C. | Total Cl (Parr Bomb) Wt. Percent |
|---|---|---|---|---|---|---|
| Water | 10 | 2.2 | | | | |
| p-Methylstyrene | 18 | 4.0 | 31° C. at 1.8 mm | .900 | 1.5342 | |
| Beta-chloro-p-methylstyrene | 27 | 6.0 | 52° C. at 1 mm | 1.16 | 1.562 | 23.0 |
| p-Methylstyrene dichloride | 36 | 8.0 | 80° C. at 1 mm | 1.20 | 1.542 | 37.4 |
| p-Methylstyrene chlorohydrin | 315 | 70.0 | 90° C. at 1 mm | 1.14 | 1.539 | ¹ 20 |
| Residue | 44 | 9.8 | | | | |
| Total recovery | 450 | | | | | |

¹ Theory=20.8+.

The dehydrochlorination of p-methylstyrene chlorohydrin was carried out in a flask similar to that previously described in the hypochlorination step. A total of 315 grams (1.85 moles) of the p-methylstyrene chlorohydrin separated in the distillation step and 266 grams of 30 percent aqueous sodium hydroxide (2.0 moles) were charged into the flask. The reactants were thoroughly and continuously mixed for a period of 30 minutes. During this time, a reaction temperature of 40° C. was maintained. Following the reaction, the crude organic product was separated from the brine and found to weigh 250 grams.

The 250 grams of crude p-methylstyrene oxide obtained above was stabilized with 0.5 weight percent 1-nitroso-2-naphthol and subjected to fractional distillation in a sieve-plate still column having 30 plates. The total p-methylstyrene oxide distilling at 60° C. at 1 mm. Hg absolute weighed 226 grams (1.67 moles). This corresponds to an overall yield of about 58 mole percent. The high purity p-methylstyrene oxide so obtained was analyzed and found to have a refractive index of 1.523 at 35° C. and a total chloride content of only 0.1 percent.

I claim:

1. In a process for preparing an arylethylene oxide from a monovinyl aromatic hydrocarbon from the group consisting of styrene and nuclearly alkylated styrenes of from 8 to 10 carbon atoms, by (1) reacting the monovinyl aromatic hydrocarbon under conditions of good mixing at a temperature between 0° C. and 60° C. with an acidified aqueous solution of a hypochlorite of a metal from the group consisting of the alkali and alkaline earth metals in proportion of from 1 to 2 chemical equivalents of the hypochlorite per mole of the monovinyl aromatic hydrocarbon, and (2) reacting the chlorohydrin of the monovinyl aromatic hydrocarbon so prepared with an aqueous alkali metal hydroxide solution to obtain the corresponding arylethylene oxide, the improvements which consist of: maintaining throughout the step (1) reaction a pH in the range of from 4 to 6; and subjecting the organic product of the step (1) reaction to fractional distillation at an absolute pressure below about 5 millimeters of mercury to remove therefrom material boiling below the boiling point of the chlorohydrin of the monovinyl aromatic hydrocarbon at the pressure employed.

2. In a process for preparing styrene oxide from styrene by (1) reacting styrene with an acidified aqueous solution of calcium hypochlorite to prepare styrene chlorohydrin and (2) reacting the styrene chlorohydrin with aqueous sodium hydroxide to obtain styrene oxide, the improvements which consist of: maintaining throughout the step (1) reaction, a reactant ratio of from 0.7 to 0.8 mole of calcium hypochlorite per mole of styrene, a pH of from 5 to 6, and a temperature of from 10° C. to 40° C.; and subjecting the organic product of the step (1) reaction to fractional distillation to remove therefrom styrene dichloride and other material boiling below the boiling point of styrene chlorohydrin, said styrene dichloride being fractionally distilled at a pressure below 5 millimeters of mercury absolute, and thereafter fractionally distilling styrene chlorohydrin away from substantially all higher boiling material.

3. In a process for obtaining styrene oxide from styrene by first (1) preparing styrene chlorohydrin by gradually adding to a well agitated aqueous suspension of styrene maintained at a temperature in the range of from 10° C. to 60° C., an aqueous solution of a hypochlorite of a metal from the group consisting of the alkali and alkaline earth metals until greater than one chemical equivalent of the hypochlorite has been added per mole of styrene, and simultaneously adding hydrochloric acid to acidify the well mixed reactants, and subsequently (2) reacting the styrene chlorohydrin with an aqueous alkali metal hydroxide solution to obtain styrene oxide, the improvements which consist of adding hydrochloric acid throughout the step (1) reaction at a rate such as to maintain the acidity of the reacting mixture at a pH in the range of from 4 to 6; and subjecting the organic product of the step (1) reaction to fractional distillation at an absolute pressure below about 5 millimeters of mercury to remove therefrom material boiling below the boiling point of styrene chlorohydrin at the pressure employed.

4. In a process for hypochlorinating styrene to styrene chlorohydrin with an aqueous solution of a hypochlorite of a metal from the group consisting of the alkali and alkaline earth metals, and thereafter reacting the styrene chlorohydrin with an aqueous alkali metal hydroxide solution to prepare styrene oxide therefrom, the steps which comprise (1) reacting styrene at a temperature between 0° C. and 60° C. with an aqueous solution of a hypochlorite of a metal from the group consisting of the alkali and alkaline earth metals in proportion of from 1 to 2 chemical equivalents of the hypochlorite per mole of styrene, while acidifying the reaction mixture to maintain the same in a pH range between 4 and 6, (2) separating from the reaction product the water-immiscible organic layer containing styrene chlorohydrin formed by the reaction, and (3) subjecting the organic layer to fractional distillation and thereby removing styrene dichloride at an absolute pressure below 5 millimeters of mercury.

References Cited in the file of this patent

UNITED STATES PATENTS

| 2,232,910 | Green | Feb. 25, 1941 |
| 2,237,284 | Alquist | Apr. 8, 1941 |
| 2,582,114 | Frisch | Jan. 8, 1952 |